United States Patent [19]

Conroy et al.

[11] Patent Number: 4,669,781
[45] Date of Patent: Jun. 2, 1987

[54] LINEAR TYPE SEAT RECLINER

[75] Inventors: Lawrence J. Conroy, Utica; Richard A. Hayden, Troy, both of Mich.

[73] Assignee: General Motors Corporation, Detroit, Mich.

[21] Appl. No.: 919,972

[22] Filed: Oct. 17, 1986

[51] Int. Cl.⁴ ............................................. B60N 1/02
[52] U.S. Cl. ............................... 297/355; 74/424.8 R; 297/353
[58] Field of Search ............... 297/355, 353, 356, 363; 74/527, 424.8 R; 188/216, 228.6, 311, 189

[56] References Cited

U.S. PATENT DOCUMENTS

| | | | |
|---|---|---|---|
| 3,183,317 | 5/1965 | McCartney | 74/527 X |
| 3,528,532 | 9/1970 | Moskow | 297/355 X |
| 4,243,264 | 1/1981 | Bell | 297/367 |
| 4,387,926 | 6/1983 | Van Eerden | 297/375 |
| 4,579,386 | 4/1986 | Rupp et al. | 297/355 |

FOREIGN PATENT DOCUMENTS 2024782 12/1970 Fed. Rep. of Germany ...... 297/355

Primary Examiner—James T. McCall
Attorney, Agent, or Firm—Ernest E. Helms

[57] ABSTRACT

The present invention provides an incremental linear vehicle recliner seat. The invention utilizes a polygonal rod with threaded apices which is pivotally connected with the seat back. The rod is surrounded with a nut connected with the seat cushion. The nut is rotated alternatively between a locking position to threadably engage the apices of the rod and a release position allowing the rod to slide through the nut thereby allowing the angular position of the seat back to be adjusted.

8 Claims, 8 Drawing Figures

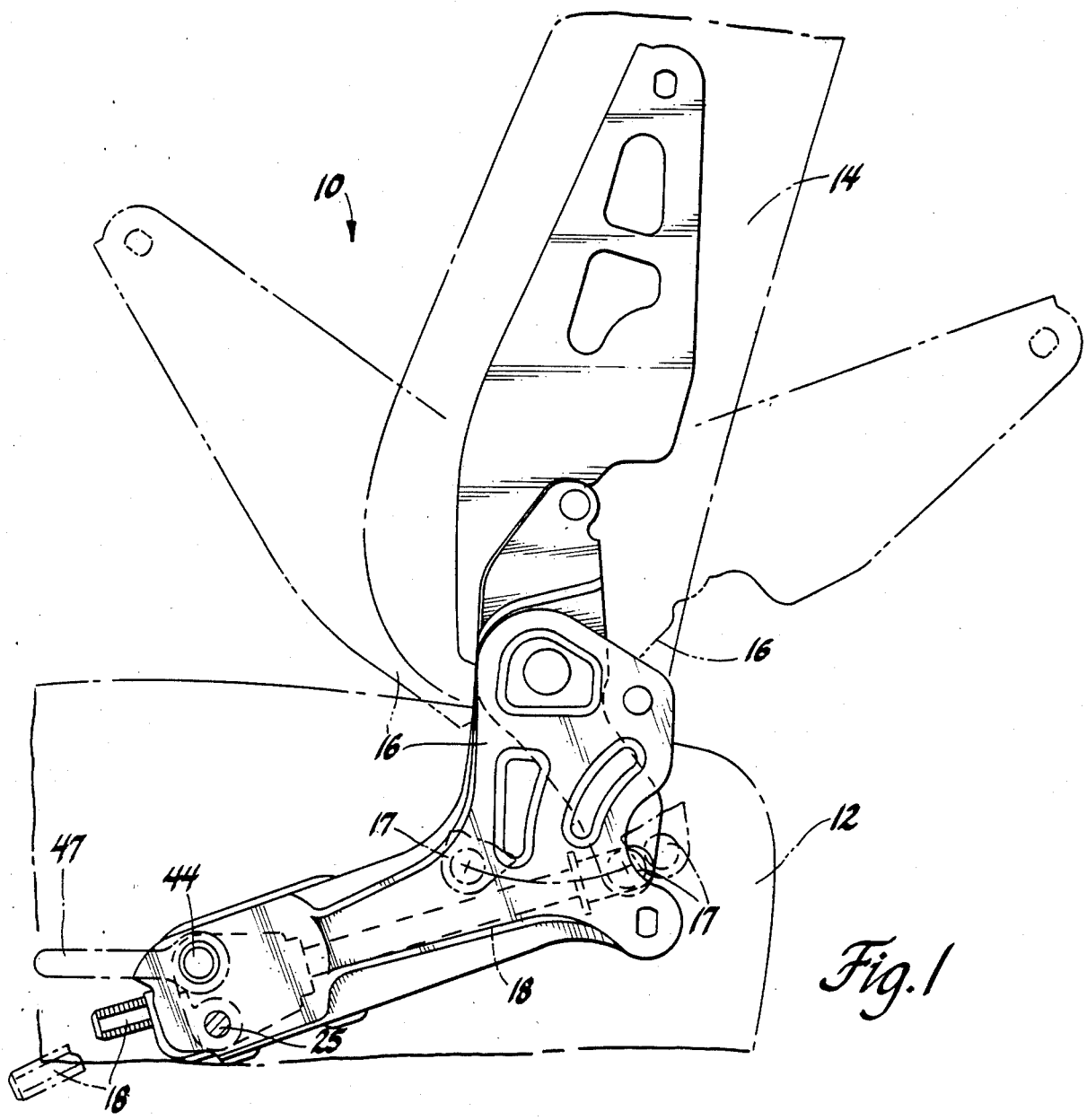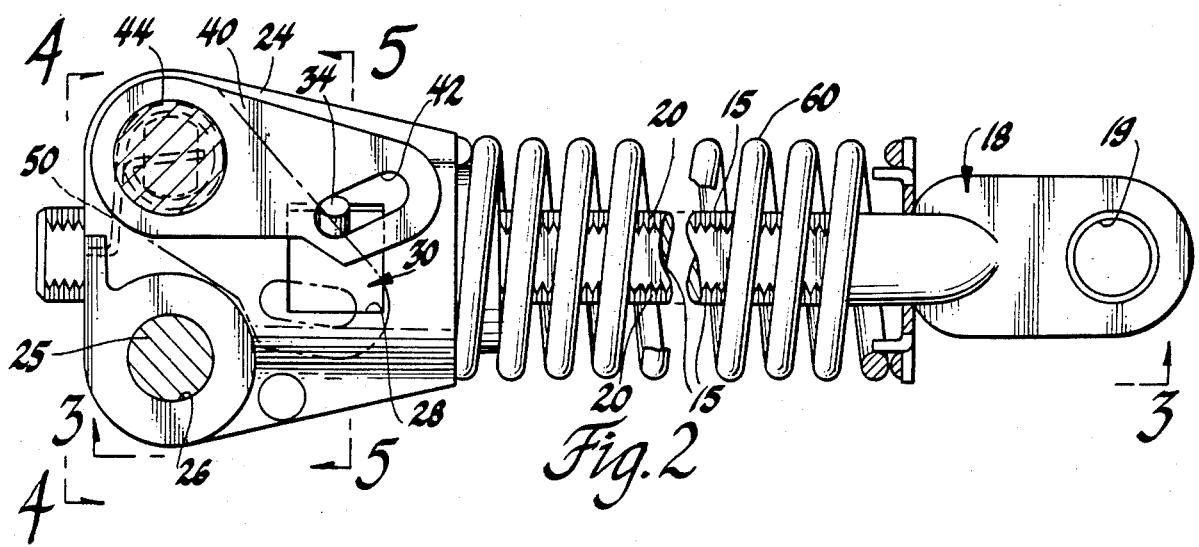

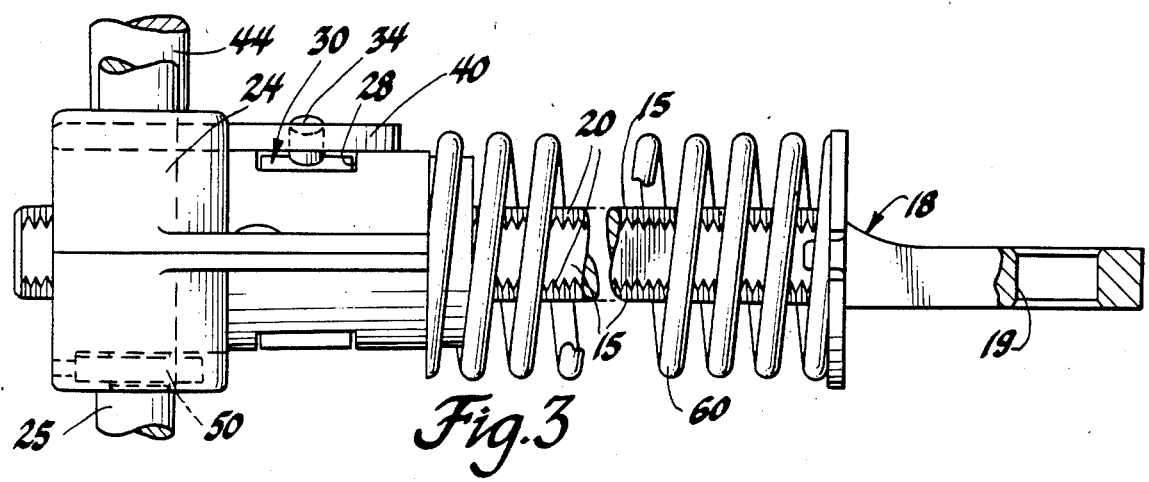
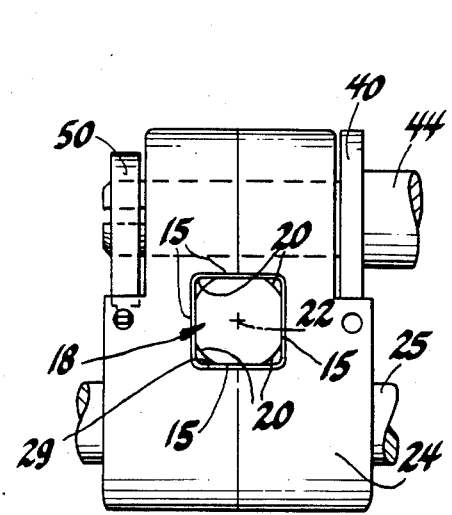
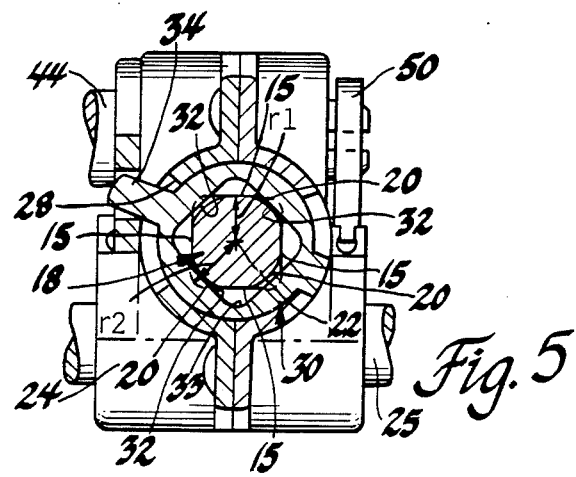
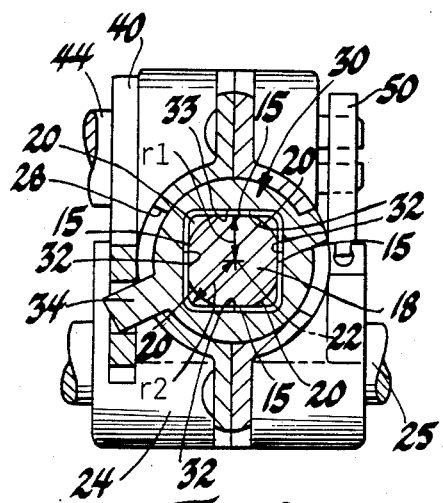
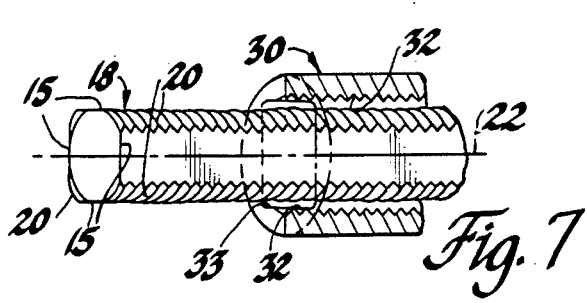
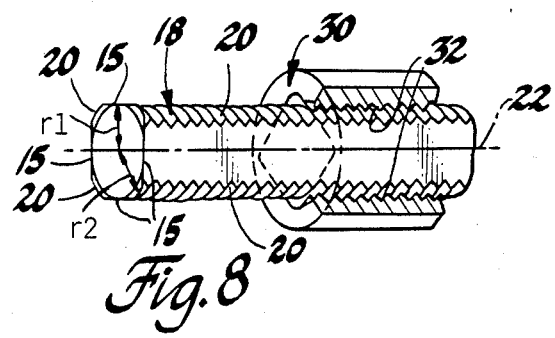

LINEAR TYPE SEAT RECLINER

FIELD OF THE INVENTION

The field of the present invention is that of vehicle recliner seats. More particularly the field of the present invention is that of vehicle recliner seats of the linear type.

DISCLOSURE STATEMENT

One type of vehicle recliner seat is the linear type. The linear type vehicle recliner seat has a seat back which is pivotally connected with the seat bottom, commonly referred to as the seat cushion. A rod is adjustably connected with the seat cushion and is pivotally connected with the seat back. There is provided a locking mechanism which fixes the length of the rod's extension between the seat back and the seat cushion. Therefore, as the rod is allowed to extend or retract, the angular position of the seat back with respect to the seat cushion is adjusted.

One method of locking the position of the rod, and thereby locking the angular orientation of the seat back, is to surround the rod with a group of wedging washers. The wedging washers are cammed into a position of engagement with the rod to lock the position of the rod. A second type of locking mechanism is a torsional spring which surrounds the rod and is selectively wound or unwound to frictionally engage with the rod. A problem of both of the above described locking mechanisms is the high precision required in the machining of the individual parts. Also since the locking mechanisms in both designs relies upon frictional engagement with the rod, erosion of the rod over a period of time can cause the locking mechanism to malfunction and require replacement.

Another type of recliner seat locking mechanism provides a mechanical lock. The mechanical locking is accomplished by engaging two separate gear tooth latches with a threaded rod. It is desirable to provide a simplified mechanical locking mechanism requiring only one latching member thereby decreasing the number of parts required.

SUMMARY OF THE INVENTION

To overcome the above noted and other problems the present invention is brought forth. The present invention provides a vehicle recliner seat having an improved thread engaging mechanical locking mechanism instead of the dual latch mechanical or frictional locking mechanisms of prior linear recliner seats.

An embodiment of the present invention provides a vehicle recliner seat wherein the rod is pivotally attached with the seat back. The rod has a polygonal cross section with threaded apices. Surrounding the rod is a single nut connected with the seat cushion. The nut has two angular positions with respect to the rod. In the first angular position, the nut threadably engages with the apices of the rod to lock the position of the rod with respect to the nut thereby locking the angular position of the seat back. Rotation of the nut to the second angular position allows the rod to move freely with respect to the nut, therefore, providing for adjustment of the angular position of the seat back.

It is an object of the present invention to provide a linear type vehicle recliner seat. It is another object of the present invention to provide a linear vehicle recliner seat which has a locking mechanism which does not depend upon frictional engagement or the use of dual latches to engage with the rod. It is still another object of the present invention to provide a method of adjusting a vehicle recliner seat.

It is yet still another object of the present invention to provide a vehicle recliner seat having a seat back adapted to move to a plurality of angular positions including a seat cushion, a seat back pivotally connected with the seat cushion, a rod pivotally connected with the seat back, the rod having a generally square cross sectional area and threaded apices along a substantial length of the rod, a housing having an aperture and being pivotally connected with the seat cushion encircling the rod, a nut mounted within the housing encircling the rod with a lug projecting through to the housing aperture and the nut being movable to first and second angular positions with respect to the threaded apices whereby the nut in the first angular position threadably engages with the threaded apices of the rod to lock the position of the rod with respect to the nut for locking the angular position of the seat back and whereby the nut in the second angular position releases the rod for adjusting the angular position of the seat back, and a handle lever pivotally connected with the housing, the handle lever having a cam slot for reception of the nut lug whereby rotation of the handle lever positions the nut in the first or second angular position.

It is yet still another object of the present invention to produce a method of adjusting a vehicle recliner seat including pivotally connecting a seat back with a seat cushion, pivotally connecting a rod with a polygonal cross sectional area with threaded apices with the seat back, surrounding the rod with a nut having a generally fixed position with respect to the seat cushion and two angular positions with respect to the rod whereby in the first angular position the nut is threadably engaged with the apices of the rod to lock the position of the rod with respect to the nut and to lock the angular position of the seat back, and the nut in the second angular position releases the rod to allow adjustment of said seat back angular position, and angularly changing the position of said nut.

Other objects, desires and advantages of the present invention will become more apparent to those skilled in the art as the nature of the invention is better understood from the accompanying drawings and a detailed description.

DESCRIPTION OF THE DRAWINGS

FIG. 1 is a side elevational view of a vehicle seat of the present invention;

FIG. 2 is a sectional view mostly in side elevation with portions cut away of the locking mechanism of the vehicle seat illustrated in FIG. 1 in the locking (solid) and the nonlocking (phantom) positions;

FIG. 3 is a view taken along line 3—3 of FIG. 2;

FIG. 4 is a view taken along line 4—4 of FIG. 2.

FIGS. 5 and 6 are sectional views taken along line 5—5 of FIG. 2 in the locking and nonlocking positions respectively;

FIGS. 7 and 8 are fragmentary sectional views of the nut and rod in the nonlocking and locking positions respectively.

DETAILED DESCRIPTION OF THE DRAWINGS

Referring to FIG. 1 the vehicle recliner seat 10 the present invention has a seat cushion 12 and seat back 14 pivotally connected by a seat latch 16. The seat back 14 is adapted to move to a plurality of angular position with respect to the seat cushion 12.

Referring in addition to FIGS. 2-8 a rod 18 is pivotally connected with the seat back 14 (via seat latch 16) by virtue of a pin 17 projecting through a rod eyelet 19. The rod 18 has a polygonal cross sectional area and in the embodiment in FIGS. 1-8 is square. The rod 18 has flats 15. The radial distance to the flat 15 taken perpendicular to flat 15 (or apothem) is equal to r1. Also the rod 18 has threaded apices 20 along a substantial portion of its length. The threaded apices 20 have a radius r2 which is greater than radius r1. The axial center line of the threaded apices 20 and the flats 15 are coaxial with the axial center line 22 of the rod 18.

A housing 24 is pivotally connected with the latch 16, and the seat cushion 12 via a bolt or pin 25 projecting through a housing opening 26. The housing 24 also has an aperture 28. The housing 24 surrounds the rod 18 and also has a square slot 29 which aligns the rod 18 and prevents rotation of the rod.

Rotatively mounted within the housing 24 is a locking nut 30. The nut 30 is provided with a generally fixed location with respect to the seat cushion 12 via the housing 24. The locking nut 30 has a lug 34 which projects through the aperture 28 in the housing 24. The nut 30 has a first angular position (FIGS. 5 and 8, and FIG. 2 solid line) wherein it is threadably engaged with the apices 20 of the rod 18. The nut 30 has an inner opening 33 with threaded surfaces 32 having a radius greater than radii r1 or r2. However the radius of threaded surface 32 is small enough that it can threadably engage with the threaded apices 20 of rod 18. In the first angular position the longitudinal position of the rod 18 with respect to the nut 30 is locked, therefore the angular position of the seat back 14 is locked. In the second angular position of nut 30 (FIGS. 6, 7, and FIG. 2 phantom), the rod 18 may move freely with respect to the nut 30, therefore the angular position of the seat back 14 may be freely adjusted. The use of nut 30 to engage with the four apices 20 of the rod 18 provide a locking force superior to that of prior mechanical locking mechanisms by increasing the amount of threaded engagement per length of rod 18.

The lug 34 of the nut 30 is received into a cam slot 42 of a cam lever 40. The cam lever 40 is on a common pivotable axis with a handle shaft 44 controlled by the seat occupant. Rotation of the handle shaft 44 rotates the cam lever 40 shifting the lug 34 causing the nut 30 to move between its first and second angular positions.

To bias the nut into its first angular (locking) position there is provided a torsion spring 50 which acts upon the cam lever 40 to urge the nut 30 into the first angular position via the lug 34.

A coil spring 60 provides the means to bias the rod 18 to a predetermined linear position with respect to the nut 30. Typically this spring 60 will be positioned to urge the seat back 14 to an upright position.

Under normal conditions the nut 30 will be urged into a locking position. When it is desired to adjust the angular position of the seat back 14, the seat occupant may grasp the handle 47 (shown in phantom, FIG. 1), twisting the handle shaft 44, therefore pivoting the cam lever 40, causing the lug to translate within the cam slot 42. The above causes the nut 30 to move to the second angular position. The seat back can now be adjusted. When the seat back 14 is adjusted to the angular position desired, the seat occupant only needs to release the handle and the spring 50 (FIGS. 2,5) will urge the cam lever 40 back to position to place the nut 30 into its first angular locked position again.

The present invention provides a method of adjusting a vehicle recliner seat including the steps of:

1. Pivotally connecting a seat back 14 with a seat cushion 12;

2. Pivotally connecting a rod 18 with a polygonal cross sectional area with threaded apices 20 with the seat back 14;

3. Surrounding the rod with a nut 30 having a generally fixed position with respect to the seat cushion 12 and two angular positions with respect to the the rod 18 whereby in the first angular position the nut 30 is threadably engaged with the rod apices to lock the position of the rod 18 with respect to the nut 30 and to lock the angular position of the seat back 14, and in the second angular position the nut 30 releases the rod 18 to allow adjustment of the angular position of seat back 14;

4. Angularly changing the position of the nut 30.

While an embodiment of the present invention has been explained it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle recliner seat with a seat back adapted to move to a plurality of angular positions, said recliner seat in combination comprising:

a seat cushion;

a seat back pivotally connected with said seat cushion;

a rod pivotally connected with said seat back, said rod having a generally polygonal cross sectional area and threaded apices along a substantial portion of the length of said rod; and a nut having a generally fixed position with respect to said seat cushion surrounding said threaded apices of said rod, said nut being movable to first and second angular positions with respect to said threaded apices whereby said nut in said first angular position threadably engages with said rod at said threaded apices to lock the position of said rod with respect to said nut for locking the angular position of said seat back and whereby said nut in said second angular position releases said rod for adjusting the angular position of said seat back.

2. A vehicle recliner seat as described in claim 1 wherein the cross sectional area of said rod is generally a square.

3. A vehicle recliner seat as described in claim 1 wherein said nut is biased to said first position.

4. A vehicle recliner seat as described in claim 1 further including a housing connected with said seat cushion and said nut being mounted within said housing.

5. A vehicle recliner seat as described in claim 1 further including a handle lever having a cam slot and wherein said nut has a projecting lug fitted within said cam slot wherein rotation of said handle lever causes said nut to move between said first and second angular positions.

6. A vehicle recliner seat as described in claim 1 further including means to bias said rod to a predetermined linear position with respect to said nut.

7. A vehicle recliner seat having a seat back adapted to move to a plurality of angular positions, said recliner seat in combination comprising:
- a seat cushion;
- a seat back pivotally connected with said seat cushion;
- a rod pivotally connected with said seat back, said rod having a generally square cross sectional area and threaded apices along a substantial length of said rod;
- a housing having an aperture and being pivotally connected with said seat cushion encircling said rod;
- a nut mounted within said housing encircling said rod with a lug projecting through said housing aperture and said nut being movable to first and second angular positions with respect to said threaded apices whereby said nut in said first angular position threadably engages with said threaded apices to lock the position of said rod with respect to said nut for locking the angular position of said seat back and whereby said nut in said second angular position releases said rod for adjusting the angular position of said seat back; and
- a handle lever pivotally connected with said housing, said handle lever having a cam slot for reception of said nut lug whereby rotation of said handle lever positions said nut in said first or second angular positions.

8. A method of adjusting a vehicle recliner seat said method in combination comprising:
- pivotally connecting a seat back with a seat cushion;
- pivotally connecting a rod with a polygonal cross sectional area with threaded apices with said seat back;
- surrounding said rod with a nut having a generally fixed position with respect to said seat cushion and two angular positions with respect to said rod whereby in said first angular position said nut is threadably engaged with said rod apices to lock the position of said rod with respect to said nut and to lock the angular position of said seat back and said nut in said second angular position releases said rod to allow adjustment of the angular position of said seat back; and
- angularly changing the position of said nut.

* * * * *